United States Patent [19]

Tramezzani

[11] Patent Number: 5,160,227

[45] Date of Patent: Nov. 3, 1992

[54] SELF-LOCKING NUT

[75] Inventor: Giancarlo Tramezzani, Ponte Tresa, Switzerland

[73] Assignee: Alian International Aktiengesellschaft, Triesen, Liechtenstein

[21] Appl. No.: 782,821

[22] Filed: Oct. 25, 1991

[30] Foreign Application Priority Data

Jul. 10, 1991 [CH] Switzerland .................. 2054/91

[51] Int. Cl.$^5$ .................. F16B 39/22; F16B 39/284
[52] U.S. Cl. .................. 411/278; 411/280; 411/324; 411/902; 411/914; 411/937.1
[58] Field of Search ............. 411/247, 250, 251, 278, 411/324, 902, 914, 937.1, 941.1, 280

[56] References Cited

U.S. PATENT DOCUMENTS

| 1,988,926 | 1/1935 | Thomson | 411/914 |
| 2,424,604 | 7/1947 | Dzus | 411/278 |
| 3,417,801 | 12/1968 | Berberian | 411/278 |
| 3,905,411 | 9/1975 | Dzus et al. | 411/278 |
| 4,684,304 | 8/1987 | Franks | 411/914 |
| 4,893,977 | 1/1990 | Tramezzani | 411/278 |

Primary Examiner—Neill R. Wilson
Attorney, Agent, or Firm—Helfgott & Karas

[57] ABSTRACT

In a self-locking nut including a threaded upper collar equipped with longitudinal slots in U-shape defining in collar a plurality of circular arc segments compressed by a helical external spring, the spring is subjected to a hot-galvanizing treatment and is provided in harmonic spring steel if it operates below 250° C., while it is provided in stainless spring steel if it operates above 250° C., and the nut, provided in stainless steel if it operates at high temperatures, is subjected to an electrolytic coppering treatment.

5 Claims, 1 Drawing Sheet

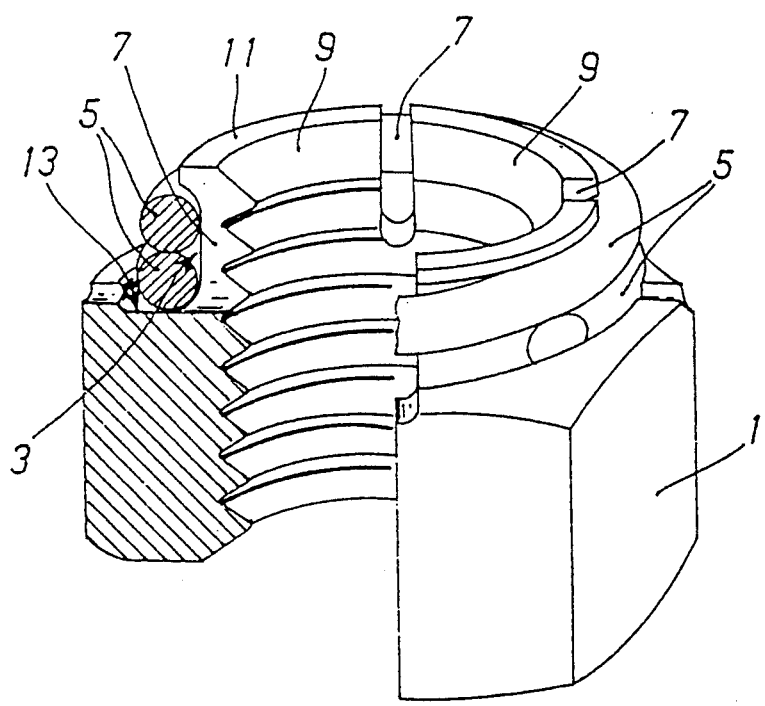

SELF-LOCKING NUT

BACKGROUND OF THE INVENTION

1. Field of the Invention

The present invention refers to an improved self-locking nut, of the type having a cylindrical end compressed by a helical spring.

2. Background Information

Some types of self-locking nuts are known, having a substantially cylindrical end equipped with vertical slots, defining circular arc segments suitable to be elastically compressed by a radially operating helical external spring.

References are first made to the self-locking nut described in U.S. Pat. No. 3,417,801, in the name of Bemex, dated Dec. 24th, 1968, where a nut is claimed that has on one of its transverse faces a ring-shaped extension, equipped with radial slots delimiting some circular arc sectors compressed by an elastic ring in such a way as to perform a radial clamping action on said sectors.

Said nut has some disadvantages, substantially due to the tightness of the vertical slots provided at the cylindrical end or collar of the nut.

Said disadvantages are substantially two:
- it is difficult to use the nut itself again after having unscrewed it, due to dirt and foreign materials penetrated in said slots during use, so that, in order to use the nut again, it is necessary to carry out an adequate cleaning operation with compressed air, solvents and/or mechanical means;
- the flexibility, and therefore compressibility, range of the walls is limited by the spring, since, after a certain bending in the radial direction, the upper edges of the circular arc segments come in mutual contact, so that the nut utility is compromised when it is applied to screws with "lean" threads.

The aforementioned disadvantages have been solved by the arrangement disclosed in U.S. Pat. No. 4,893,977, in the name of Alian International A. G., dated Jan. 16th, 1990.

In said Patent a self-locking nut is claimed in which, in its collar, some V or U-shaped grooves are provided, wide enough as to prevent the above-mentioned disadvantages due to the slot tightness. The disadvantages that the present Patent aims to solve are not strictly linked to this last Patent but to some current techniques, even if they are not expressly indicated.

Since the helical spring which the nut is equipped with must be protected from oxidation, a solution was to phosphatize said spring, provided in spring steel, and the other solution was to make said spring of stainless steel (when used above 250° C.).

Now, it has been discovered that:

1. phosphating does not provide an adequate protection of said spring from oxidation;

2. making the spring of stainless steel generates other disadvantages, such as:

2.1. excessive costs, justified only for types of nuts provided to be used at high temperatures (above 250° C.);

2.2. utilization that is advisable only for nuts provided for temperatures that are greater than 250° C., since at lower temperatures it is preferable to use normal springs (made of spring steel) that have a better elasticity and consequently provides the nut with a greater braking torque;

2.3. as an average, the current springs in stainless steel give the nut a braking torque that is much lower than the one of the corresponding springs in spring steel.

SUMMARY OF THE INVENTION

Purpose of the nut object of the present invention is solving the above-mentioned inconveniences providing a nut that shows the following advantages:
- small costs;
- resistance to oxidation;
- utilization of the nut at all temperatures.

It must be taken into account that the current technique provides at least three executions for high temperatures, above 250° C., always and anyway with springs made of stainless steel:

a) steel nut with low carbon content;
b) steel nut with high carbon content;
c) stainless steel nut.

The three above solutions, particularly solutions a) and b), have the disadvantage of engaging too much with screws or studs after a certain stay at high temperature (400°-500° C.). In solution c) the phenomenon occurs for a lower number of times, but it can sometimes generate some inconveniences. In the specific case, the term "inconvenience" means that, trying to unscrew the nut, the stud is instead unscrewed from its seat or, worse, the stud itself is sheared.

Supposing that this "inconvenience" occurs even only once while revising or maintaining an engine (on which ten or more nuts can be assembled), this implies remarkable practical problems; in the first case, the replacement of the stud with another one having the tolerance position on a diameter that is greater than the previous one; in the second case, instead, the problem is more serious, since it is necessary to drill the stud and to disassemble it (in pieces) with makeshifts, taking into account that almost always these operations must be carried out in not very comfortable positions, in particular if the engine is assembled on a vehicle.

A further purpose of the present invention is to solve this latter inconvenience, providing a nut treated in such a way as to enable its easy disassembly without allowing its uncontrolled and undesired loosening, that will cause a gas leakage with following burning of the possible seal gasket.

The above-said and other purposes and advantages of the invention, as they will result from the following description, are reached with an improved self-locking nut including an upper threaded collar equipped with U-shaped longitudinal slots, defining in the collar itself a plurality of circular arc segments compressed by a helical external spring, and of such a width as not to allow the mutual contact of said circular arc segments, characterized in that said spring, before being wound, is hot-galvanized, in order to provide a better protection from oxidation.

A further property of the present invention is that the nut is subjected to an electrolytic coppering treatment, in order to avoid weldings between nut and screw.

Another further property of the present invention is that, if the operating temperature is less than 250° C., the helical spring, hot-galvanized, is made of harmonic spring steel.

A further property is that, if the operating temperature is greater than 250° C., the helical spring is made of stainless spring steel.

The invention will now be described in detail with particular reference to the accompanying drawing, provided as a not limiting example.

BRIEF DESCRIPTION OF THE DRAWING

The accompanying drawing shows a self-locking nut in a perspective view.

DESCRIPTION OF THE PREFERRED EMBODIMENT

With reference to the FIGURE, the related nut is indicated with 1 and is screwed on a threaded rod, not shown, but obviously inside the nut itself.

The nut 1 is equipped with a collar 3 on which the helical spring 5 is wound operating with radial pressure on said collar 3, and from here to the threaded rod on which the nut 1 is applied, thanks to the wide slots 7, U-shaped, provided into the collar 3 itself.

Said slots 7 generate on the collar 3 a series of circular arc segments 9 equipped with a small upper external rib.

On the upper face of the nut 1, an hollow seat 13 is provided where the helical spring 5 is housed, that winds the collar 3 radially compressing the segments 9 against the threaded rod on which the nut 1 is screwed.

No further indications are deemed necessary, since, mechanically, the description of the nut itself indicated in the above-mentioned U.S. Pat. No. 4,893,977, is still valid.

I claim:

1. An improved self-locking nut including an upper threaded collar equipped with U-shaped longitudinal slots defining in the collar a plurality of circular arc segments compressed by a helical external spring, said spring being of such a width as to prevent the mutual contact of said circular arc segments, wherein said spring, before being assembled on said segments is hot-galvanized, in order to provide a better protection from oxidation.

2. Self-locking nut according to claim 1, wherein, if the operating temperature is less than 250° C., the helical spring, hot-galvanized, is made of harmonic spring steel.

3. Self-locking nut according to claim 1, wherein the nut is subjected to an electrolytic coppering treatment; said coppering protecting the nut itself from corrosion and helping its disassembling in general, and, when carried out on stainless steel nuts, allowing disassembling without difficulties even after a long stay at high temperatures.

4. An improved self-locking nut including an upper threaded collar equipped with U-shaped longitudinal slots defining in the collar a plurality of circular arc segments compressed by a helical external spring, said spring being of such a width as to prevent the mutual contact of said circular arc segments, wherein said spring, for operation at high temperatures above 250° C. is made of stainless spring steel in order to provide a better protection from oxidation.

5. A self-locking nut including an upper threaded collar equipped with U-shaped longitudinal slots defining in the collar a plurality of circular arc segments compressed by a helical external spring, said spring being of such a width as to prevent the mutual contact of said circular arc segments, wherein said spring, before being assembled on said segments is hot-galvanized, in order to provide a better protection from oxidation, and wherein the nut is subjected to an electrolytic coppering treatment; said coppering protecting the nut itself from corrosion and helping its disassembling in general, and, when carried out on stainless steel nuts, allowing disassembling without difficulties even after a long stay at high temperatures above 400°–500° C.

* * * * *